(12) United States Patent
Sauder et al.

(10) Patent No.: US 11,412,652 B2
(45) Date of Patent: Aug. 16, 2022

(54) CROP INPUT APPLICATION SYSTEMS, METHODS, AND APPARATUSES

(71) Applicant: 360 YIELD CENTER, LLC, Morton, IL (US)

(72) Inventors: Tim Sauder, Morton, IL (US); Connor Hesterberg, Tremont, IL (US); Jonathan T. Welte, Bringhurst, IN (US); Phil Baurer, Morton, IL (US)

(73) Assignee: 360 YIELD CENTER, LLC, Morton, IL (US)

( * ) Notice: Subject to any disclaimer, the term of this patent is extended or adjusted under 35 U.S.C. 154(b) by 300 days.

(21) Appl. No.: 16/417,929

(22) Filed: May 21, 2019

(65) Prior Publication Data

US 2019/0350127 A1 Nov. 21, 2019

Related U.S. Application Data

(60) Provisional application No. 62/674,145, filed on May 21, 2018.

(51) Int. Cl.

| | | |
|---|---|---|
| *A01C 7/10* | (2006.01) | |
| *B05B 12/08* | (2006.01) | |
| *A01C 21/00* | (2006.01) | |
| *A01C 7/06* | (2006.01) | |
| *A01C 23/00* | (2006.01) | |
| *A01C 5/06* | (2006.01) | |

(52) U.S. Cl.
CPC .............. *A01C 7/105* (2013.01); *A01C 7/06* (2013.01); *A01C 7/107* (2013.01); *A01C 21/00* (2013.01); *A01C 23/007* (2013.01); *B05B 12/084* (2013.01); *A01C 5/068* (2013.01)

(58) Field of Classification Search
CPC ........... A01C 7/06; A01C 7/105; A01C 7/107; A01C 21/00; A01C 21/007; A01C 23/007; A01C 21/005; B05B 12/084
See application file for complete search history.

(56) References Cited

U.S. PATENT DOCUMENTS

| | | | |
|---|---|---|---|
| 3,653,550 A * | 4/1972 | Williams ................ | A01C 7/18 222/136 |
| 7,370,589 B2 | 5/2008 | Wilkerson et al. | |
| 7,726,251 B1 * | 6/2010 | Peterson ................ | A01C 7/102 111/185 |
| 9,763,381 B2 | 9/2017 | Grimm et al. | |
| 9,918,426 B2 * | 3/2018 | Grimm ................ | A01C 23/007 |
| 2004/0237394 A1 * | 12/2004 | Mayfield .............. | A01C 21/007 47/58.1 FV |
| 2012/0046838 A1 * | 2/2012 | Landphair .............. | G06F 11/30 701/50 |
| 2012/0260835 A1 * | 10/2012 | Stark ...................... | A01C 7/06 111/120 |

(Continued)

FOREIGN PATENT DOCUMENTS

WO 2019050944 A1 3/2019

*Primary Examiner* — Thomas B Will
*Assistant Examiner* — Ian A Normile
(74) *Attorney, Agent, or Firm* — Klintworth & Rozenblat IP LLP

(57) ABSTRACT

A crop input applicator is provided. The crop input applicator monitors the presence of applied liquid crop in a seed trench and/or the relative placement of liquid crop and seed in a seed trench. In another aspect, the crop input applicator minimizes an offset between the liquid crop and seed placement.

34 Claims, 3 Drawing Sheets

(56) References Cited

U.S. PATENT DOCUMENTS

| | | | |
|---|---|---|---|
| 2015/0134210 A1* | 5/2015 | Steffen | A01C 19/02 |
| | | | 701/50 |
| 2017/0049044 A1 | 2/2017 | Stoller et al. | |
| 2017/0251656 A1* | 9/2017 | Kolb | A01C 23/047 |
| 2018/0242515 A1* | 8/2018 | Yajima | A01C 7/105 |
| 2019/0159398 A1* | 5/2019 | McMenamy | A01C 23/028 |
| 2019/0257678 A1* | 8/2019 | Posselius | G01F 1/662 |
| 2019/0289779 A1* | 9/2019 | Koch | A01C 7/105 |
| 2020/0296882 A1* | 9/2020 | Madison | A01C 1/06 |
| 2021/0084807 A1* | 3/2021 | Obrist | A01C 7/105 |

\* cited by examiner

CROP INPUT APPLICATION SYSTEMS, METHODS, AND APPARATUSES

RELATED APPLICATIONS

The disclosure claims the priority benefit of U.S. provisional patent application Ser. No. 62/674,145 filed on May 21, 2018, which is hereby incorporated by reference herein in its entirety.

FIELD OF THE DISCLOSURE

The disclosure generally relates to crop input applicators and, more particularly, to crop input applicators incorporated on a planter row unit.

BACKGROUND

Crop input applicators are used to apply crop inputs (e.g., liquid, fertilizer, nitrogen, etc.) into soil. Some such applicators are incorporated on a planter row unit.

DESCRIPTION

Figure 1:
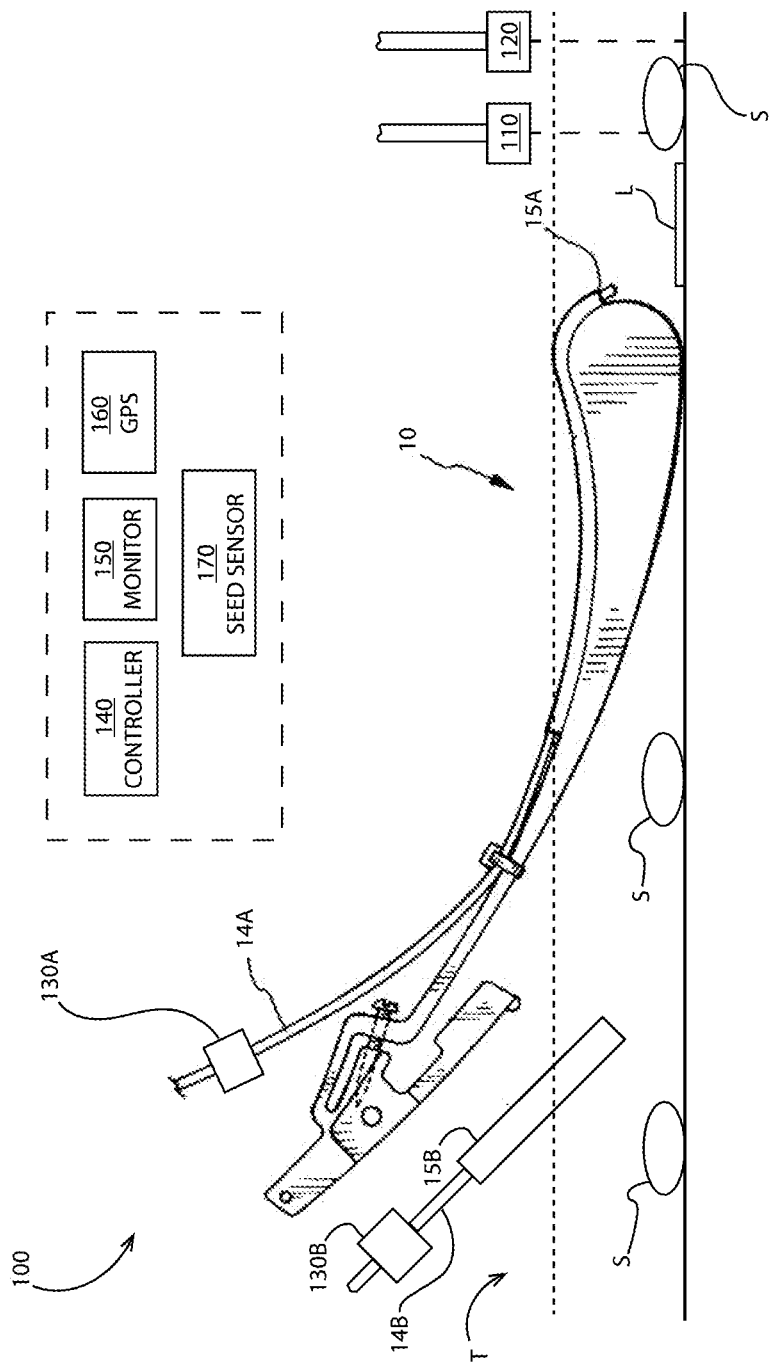
FIG. 1 is a partial side elevation view of one example of a planter row unit and a schematic illustration of one example of a monitoring system.

Referring to the drawings, wherein like reference numerals designate identical or corresponding parts throughout the several views, FIG. 1 illustrates a seed firmer 10 (e.g., supported on a planter row unit). The planter row unit may have certain common features and functionality with one or more embodiments disclosed in U.S. Pat. No. 5,852,982, which is incorporated by reference herein. The seed firmer 10 generally firms seeds S (e.g., planted by the planter row unit) into the bottom of the trench T.

The planter row unit optionally dispenses crop input (e.g., liquid crop input such as fertilizer, pesticide, herbicide, biologics, or any type of crop input). The crop input may comprise any type of liquid. In other embodiments, the crop input may comprise a non-liquid substance or may otherwise vary. Throughout this disclosure when the term "liquid crop input" is used it is noted that in other embodiments any type of crop input may be utilized in liquid or non-liquid substance form. In some embodiments, a conduit 14A directs crop input to an outlet 15A behind the seed firmer 10 along the travel direction of the planter row unit. The outlet 15A is optionally disposed to direct liquid crop input toward the trench T (e.g., toward the bottom of the trench T) at a position rearward of the seed firmer 10. In the illustrated embodiment, the outlet 15A is optionally disposed forward of the sensors 110, 120 along the travel direction of the implement; in other embodiments, the outlet 15A is optionally disposed rearward of one or more sensors (e.g., sensors 110 and/or 120). A valve 130A is optionally used to selectively stop the application of liquid crop input and/or to modify the rate of liquid crop input application along conduit 14A. In some embodiments, another conduit 14B additionally or alternatively directs liquid crop input to another outlet 15B which is optionally disposed to direct liquid crop input toward the trench T at a position forward of the position at which seeds are firmed into the trench T by the seed firmer 10. The liquid crop input directed through outlet 15B is optionally selectively stopped (and/or has its rate of application modified) by a separate valve 130B or by the valve 130A according to various embodiments.

Liquid crop input is optionally deposited in longitudinally extending bands L in the trench T. A monitoring system 100 includes a controller 140 for modifying a state of (e.g., opening or closing) one or more valves 130A, 130B in order to modify the position of the bands of liquid crop input L in the trench T. The controller 140 may comprise any number of computer processors comprising memory storing computer-implemented instructions. In some embodiments, the monitoring system 100 controls one or more valves 130A, 130B in order to place the bands of liquid crop input L on or adjacent to one or more seeds S. In some such embodiments, the monitoring system 100 consults a seed sensor 170 in order to estimate a position of seeds S in the trench T.

In some embodiments, one or more sensors 110 are disposed and configured to detect the presence of liquid crop input (e.g., bands L) such as in the trench T. Sensor 110 may comprise an optical, electromagnetic, reflectivity, thermal, or other type of sensor.

In some embodiments, one or more sensors 120 are disposed and configured to detect the presence of seeds S in the trench T. Sensor 120 may comprise an optical, electromagnetic, reflectivity, thermal, or other type of sensor.

In some embodiments, the monitoring system 100 includes a monitor 150 optionally including a graphical user interface. The monitor 150 is optionally in data communication with the sensors 110 and/or 120. The monitor 150 optionally consults a global positioning system (GPS) receiver 160 to associate positions of bands L and seeds S (e.g., positions of seeds detected in-trench or estimated based on a seed sensor 170) with georeferenced locations. The monitor 150 optionally generates and displays a map or other visual representation of the position of bands L and seeds S. The monitor 150 optionally calculates and displays a statistical representation (e.g., numerical criterion) of the successful placement of bands L relative to seeds S (e.g., on the seeds S, near the seeds S, between seeds S, etc.)

In some embodiments, the monitoring system 100 modifies an operational criterion of one or more planter row units (or the planter) based on the detected position of liquid crop input (e.g., bands L) and or the statistical placement of bands L relative to seeds S. For example, the system may carry out one or more of the following actuations: controlling one or more liquid application valves (e.g., for application of any one or more of the following or a mixture thereof: water, fertilizer, biologics, insecticide, fungicide, etc.) such as closing, opening or modifying an application rate of the one or more valves or modifying a product mixture to be applied by the valves; retracting, extending, or modifying a setting (e.g., downpressure, position, angle, aggressiveness, etc.) of a row cleaner, closing wheel, row unit downforce cylinder, or other actuator; and/or controlling a seed metering criteria (e.g., modifying a seeding rate, seed type, etc.).

In some embodiments, a seed sensor and/or additional seed sensor (e.g., optical sensor, electromagnetic sensor, thermal sensor, reflectivity sensor, etc.) may be provided on (e.g., mounted to, supported on, mounted at least partially inside, mounted to a lower end of, etc.) the seed firmer 10. In some embodiments such as the embodiment just described, a liquid application sensor (e.g., optical sensor, electromagnetic sensor, thermal sensor, reflectivity sensor, etc.) may be provided on (e.g., mounted to, supported on, mounted at a generally rearward end of, etc.) the seed firmer 10.

In some embodiments, a sensor (e.g., sensor 110, sensor 120, a seed firmer-mounted sensor, etc.) is optionally disposed and configured to both identify the presence of a seed in the trench T and determine whether the seed is dry or wet (e.g., indicating that a liquid or other crop input has been applied to the seed). The sensor may comprise a camera, reflectivity (e.g., IR, NIR, etc.), or other suitable sensor.

In some embodiments, the monitoring system 100 determines a theoretical seed placement (e.g., based on an in-seed-tube seed sensor) and determines a theoretical liquid crop placement (e.g., based on one or more valve commands). In other embodiments, the monitoring system 100 determines an actual seed placement based on an in-trench measurement (e.g., made by sensor 110 and/or 120) and determines an actual liquid crop placement based on an in-trench measurement (e.g., made by sensor 110 and/or 120). In other embodiments, the monitoring system 100 determines an actual seed placement based on an in-trench measurement (e.g., made by sensor 110 and/or 120) and determines a theoretical liquid crop placement (e.g., based on one or more valve commands). In other embodiments, the monitoring system 100 determines a theoretical seed placement (e.g., based on an in-seed-tube seed sensor) and determines an actual liquid crop placement based on an in-trench measurement (e.g., made by sensor 110 and/or 120).

Figure 2:
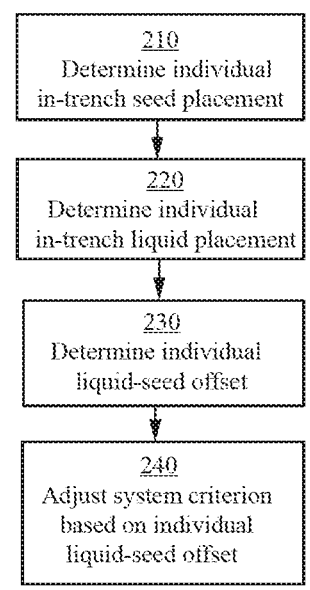
FIG. 2 illustrates an embodiment of a process for controlling a monitoring and control system.

A process flow 200 for monitoring and controlling seed and liquid placement (e.g., using the system 100) is illustrated in FIG. 2. In other embodiments, the process flow 200 may be used to monitor and control seed and liquid crop placement, or to monitor and control seed and non-liquid substance placement. At step 210, an individual in-trench seed placement is determined (either theoretically or based on an in-trench measurement). At step 220, an individual in-trench liquid placement is determined (either theoretically or based on an in-trench measurement). The liquid may comprise a liquid crop. In other embodiments, in step 220 a non-liquid substance placement may be determined. At step 230, an individual liquid-seed offset (e.g., time offset, distance offset, etc.) is calculated between the individual seed placement and the individual liquid placement. In other embodiments, step 230 may calculate an individual liquid crop-seed offset, or an individual non-liquid substance-seed offset. At step 240, a system criterion (e.g., seed meter criterion such as seed disc RPM, etc. or a liquid application criterion such as a valve open time, etc.) is adjusted based on (e.g., in order to minimize) the individual liquid-seed offset. In other embodiments, step 240 may adjust a system criterion based on a liquid crop-seed offset, or on a non-liquid substance-seed offset.

Figure 3:
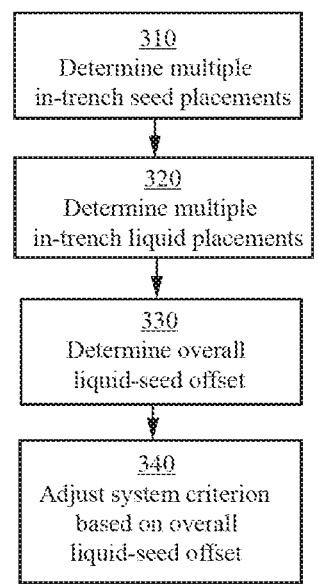
FIG. 3 illustrates another embodiment of a process for controlling a crop input monitoring and control system.

An alternative process flow 300 for monitoring and controlling seed and liquid placement (e.g., using the system 100) is illustrated in FIG. 3. In other embodiments, the alternative process flow 300 may be used to monitor and control seed and liquid crop placement, or to monitor and control seed and non-liquid substance placement. At step 310, multiple in-trench seed placements are determined (either theoretically or based on an in-trench measurement). At step 320, multiple in-trench liquid placements are determined (either theoretically or based on an in-trench measurement). At step 330, an overall liquid-seed offset (e.g., a time offset or distance offset, either of which may optionally comprise a statistical offset such as an average offset, median offset, etc.) is calculated between the plurality of seed placements and the plurality of liquid placements. In other embodiments, step 330 may calculate an overall liquid crop-seed offset, or an overall non-liquid substance-seed offset. At step 340, a system criterion (e.g., seed meter criterion such as seed disc RPM, etc. or a liquid application criterion such as a valve open time, etc.) is adjusted based on (e.g., in order to minimize) the overall liquid-seed offset. In other embodiments, step 340 may adjust a system criterion based on an overall liquid crop-seed offset, or on an overall non-liquid substance-seed offset.

Although various examples and embodiments have been described above, the details and features of the disclosed examples and embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one example or embodiment may be used in any other example or embodiment.

The invention claimed is:

1. A method of controlling a crop input applicator, the crop input applicator having a monitoring system comprising a controller, a seed sensor configured to determine the placement of a seed in a seed trench, and an applied-liquid sensor configured to determine the placement of applied liquid in the seed trench, the method utilizing the monitoring system to:
   determine an in-trench seed placement comprising an individual seed placement or a plurality of in-trench seed placements;
   determine an in-trench liquid placement;
   determine a liquid-seed offset; and
   adjust a system criterion, comprising a seed meter operational criterion, based on a liquid-seed offset in order to minimize the liquid-seed offset.

2. The method of claim 1, wherein said in-trench seed placement comprises the individual seed placement.

3. The method of claim 2, wherein the seed sensor comprises an optical sensor.

4. The method of claim 2, wherein the crop input applicator further comprises a valve used to control application of the liquid.

5. The method of claim 2, wherein the applied-liquid sensor comprises an electromagnetic sensor.

6. The method of claim 2, wherein said system criterion further comprises a liquid application valve operating criterion.

7. The method of claim 1, wherein said in-trench seed placement comprises the plurality of in-trench seed placements.

8. The method of claim 7, wherein the seed sensor comprises an optical sensor.

9. The method of claim 7, wherein the crop input applicator further comprises a valve used to control application of the liquid.

10. The method of claim 7, wherein the applied-liquid sensor comprises an electromagnetic sensor.

11. The method of claim 7, wherein said system criterion further comprises a liquid application valve operating criterion.

12. The method of claim 1, comprising said in-trench seed placement being directly measured by the seed sensor in a final position of the seed in the seed trench.

13. The method of claim 12, wherein the seed sensor comprises an optical sensor.

14. The method of claim 12, wherein the crop input applicator further comprises a valve used to control application of the liquid.

15. The method of claim 12, wherein the applied-liquid sensor comprises an electromagnetic sensor.

16. The method of claim 1, comprising the seed sensor detecting the seed prior to the final position of the seed in the seed trench.

17. The method of claim 16, wherein the applied-liquid sensor comprises an electromagnetic sensor.

18. The method of claim 1 further comprising utilizing the monitoring system to: determine a georeferenced location, utilizing a global positioning system, of the in-trench seed placement, and to determine a second georeferenced location, utilizing the global positioning system, of the in-trench liquid placement.

19. The method of claim 1 further comprising generating and displaying a map or other visual representation of the in-trench seed placement and the in-trench liquid placement.

20. The method of claim 1 further comprising calculating and displaying a statistical representation of a successful placement of the in-trench liquid placement relative to the in-trench seed placement.

21. The method of claim 1 further comprising the seed sensor being located on a seed firmer.

22. The method of claim 1 further comprising the applied-liquid sensor being located on a seed firmer.

23. The method of claim 1 further comprising the seed sensor, the applied-liquid sensor, or another sensor identifying the presence of the seed in the seed trench and determining whether the seed is dry or wet.

24. The method of claim 1 wherein the seed sensor is configured to determine a theoretical in-trench seed placement and the applied-liquid sensor is configured to determine a theoretical in-trench liquid placement.

25. The method of claim 1 wherein the seed sensor is configured to determine an actual in-trench seed placement and the applied-liquid sensor is configured to determine an actual in-trench liquid placement.

26. The method of claim 1 wherein the seed sensor is configured to determine a theoretical in-trench seed placement and the applied-liquid sensor is configured to determine an actual in-trench liquid placement.

27. The method of claim 1 wherein the seed sensor is configured to determine an actual in-trench seed placement and the applied-liquid sensor is configured to determine a theoretical in-trench liquid placement.

28. The method of claim 1 wherein the liquid-seed offset comprises a time offset.

29. The method of claim 1 wherein the liquid-seed offset comprises a distance offset.

30. The method of claim 1 wherein the liquid-seed offset comprises an average offset.

31. The method of claim 1 wherein the liquid-seed offset comprises a median offset.

32. The method of claim 1 wherein the system criterion further comprises a valve open time.

33. The method of claim 1 wherein the system criterion comprises a seed disc RPM.

34. The method of claim 1 wherein the seed sensor and the applied-liquid sensor comprise two separate, distinct sensors.

* * * * *